June 14, 1949.    L. S. WILLIAMS    2,473,083
HYDRAULIC WEIGHING SCALE
Filed June 23, 1945    3 Sheets-Sheet 1
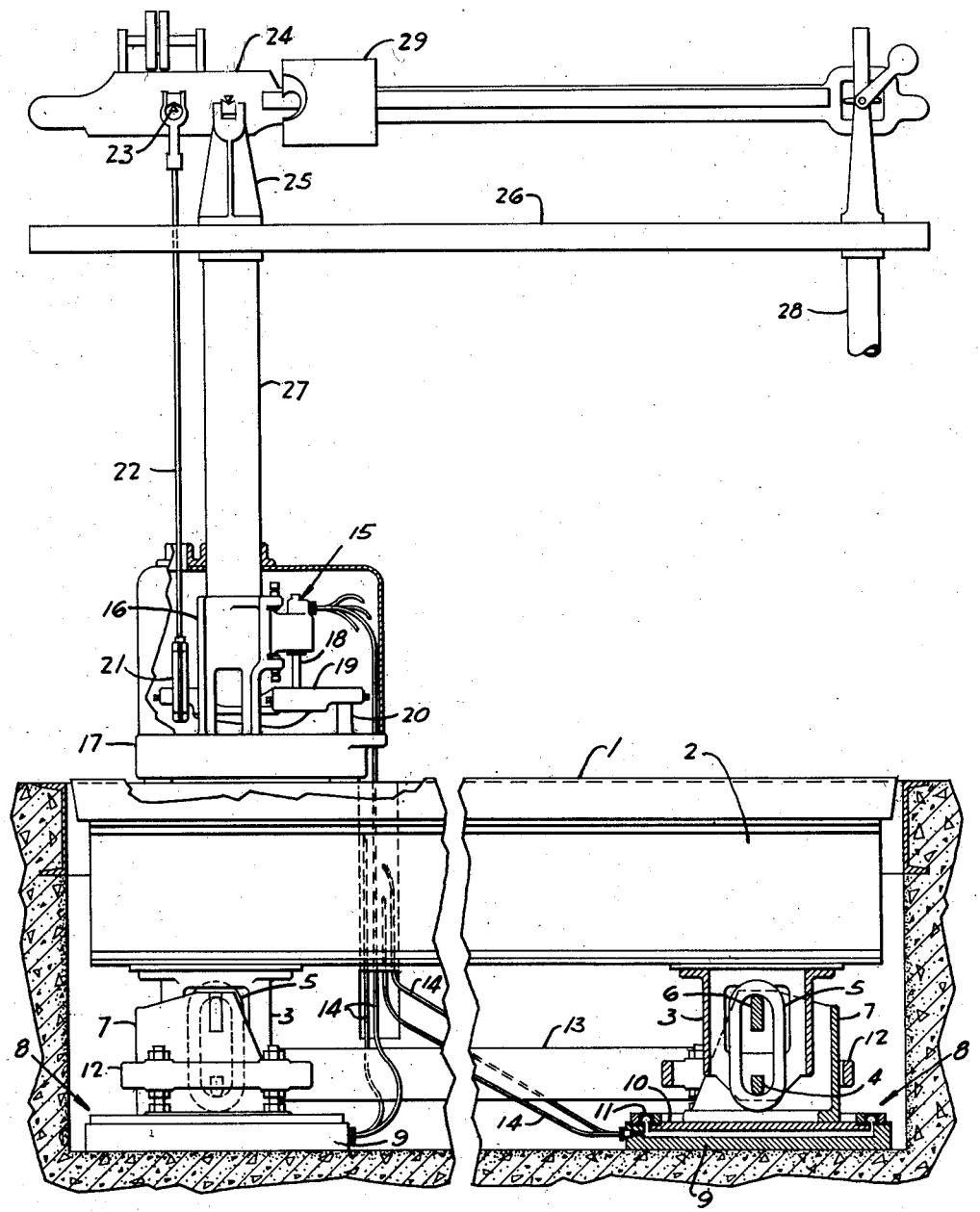
Fig. I
INVENTOR.
Lawrence S. Williams
BY
Marshall & Marshall
ATTORNEYS June 14, 1949.  L. S. WILLIAMS  2,473,083
HYDRAULIC WEIGHING SCALE
Filed June 23, 1945  3 Sheets-Sheet 2
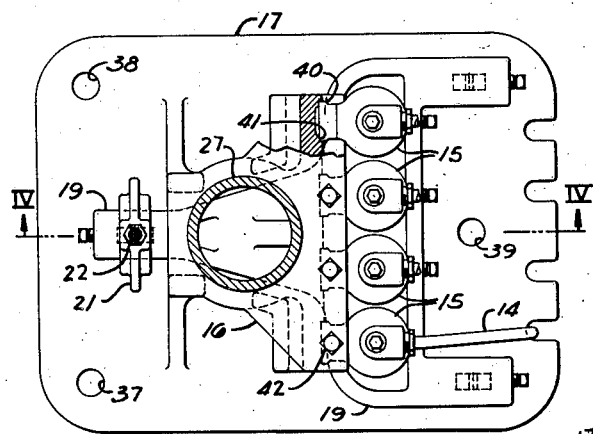
Fig. II
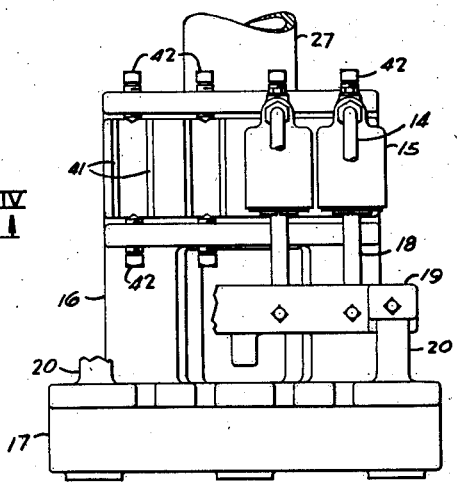
Fig. III
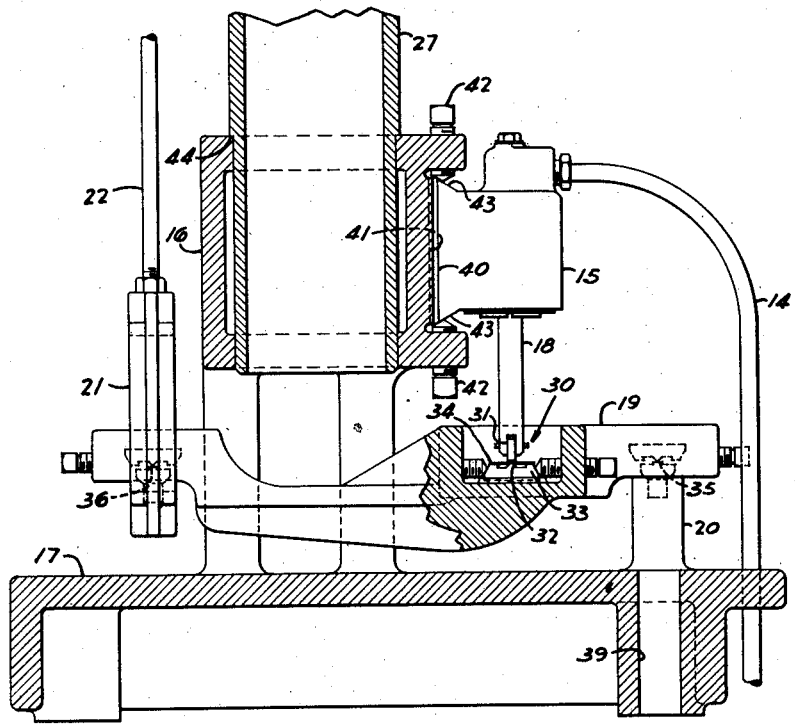
Fig. IV
INVENTOR.
Lawrence S. Williams
BY
Marshall & Marshall
ATTORNEYS June 14, 1949.  L. S. WILLIAMS  2,473,083
HYDRAULIC WEIGHING SCALE
Filed June 23, 1945  3 Sheets-Sheet 3
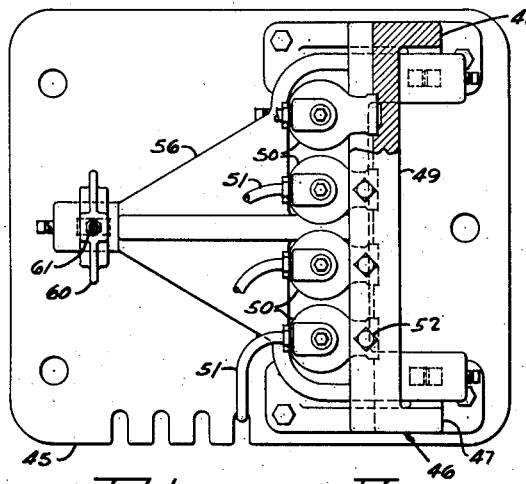
Fig. V
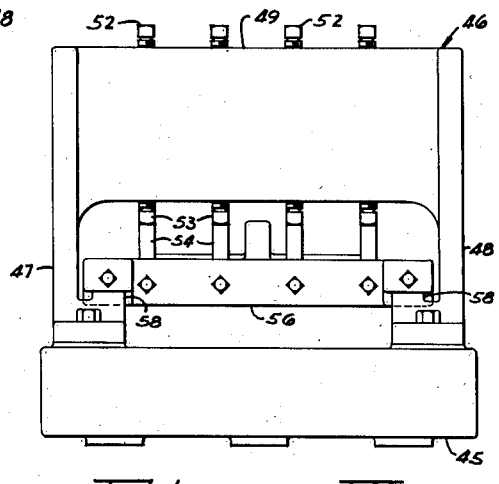
Fig. VI
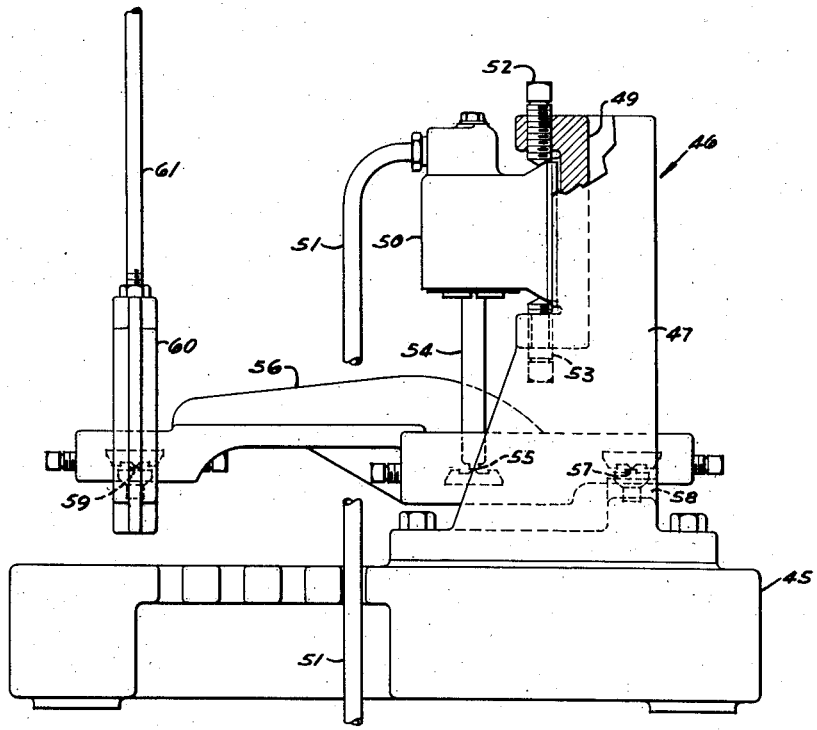
Fig. VII
INVENTOR.
Lawrence S. Williams
BY
Marshall & Marshall
ATTORNEYS Patented June 14, 1949

2,473,083

UNITED STATES PATENT OFFICE 2,473,083

HYDRAULIC WEIGHING SCALE

Lawrence S. Williams, Toledo, Ohio, assignor to Toledo Scale Company, Toledo, Ohio, a corporation of New Jersey Application June 23, 1945, Serial No. 601,225

1 Claim. (Cl. 265—47)

This invention relates to hydraulic weighing scales and in particular to a construction designed to eliminate the errors produced by the spring effect of the receiving elements of hydraulic force transmitting systems employed in hydraulic scales.

In the construction of hydraulic force transmission systems for use in weighing scales it has been found difficult, if not impossible, to eliminate the resiliency of the devices employed to translate force into hydraulic pressure at the load receiver and hydraulic pressure into force at the load counter-balancing mechanism. In consequence the load on the load receiver is counterbalanced partially by the spring effect of the elements of the hydraulic systems and partially by the load counterbalancing mechanism. The ideal scale is one in which all of the load is counterbalanced by the load counterbalancing mechanism and the hydraulic systems act solely as force transmitters. In an actual scale, because the load is counterbalanced partly by the resiliency of the hydraulic systems and the load counterbalancing mechanism is calibrated accordingly, i. e. is calibrated to include in its indication that part of the load counterbalanced by the hydraulic systems, it is necessary that the load counterbalancing mechanism always occupy exactly the same position for a given load. Only when this condition is satisfied can the indication of the load counterbalancing mechanism be made to accurately include the counterbalancing effect of the hydraulic system.

The object of this invention is to provide an assembly in which the relative position of the receiving element of a hydraulic force transmission system with respect to a load counterbalancing mechanism may be precisely maintained.

Another object of the invention is to provide an assembly in which not only are the relative positions of the hydraulic elements and the load counterbalancing mechanism precisely maintained but also all friction tending to interfere with elastic deformation of the assembly under load is eliminated.

A still further object is to provide means for adjusting the position of the hydraulic elements with respect to the load counterbalancing mechanism such that when their positions are once adjusted the adjustment is immune to load forces applied to the assembly.

A still further object is to provide compensation for the spring effect of the elements of the hydraulic force transmission system in that part of the load counterbalancing mechanism receiving force from the hydraulic elements.

Other objects and advantages are apparent from the following description in which reference is made to the accompanying drawings.

In the drawings:

Figure I is an elevation, partly in section and with parts broken away, of a hydraulic weighing scale embodying the invention.

Figure II is a plan view, partly in section, of the assembly for translating hydraulic pressure into load force to be applied to counterbalancing mechanism.

Figure III is an end elevation, with parts broken away, of the assembly shown in Figure II.

Figure IV is a vertical section taken substantially along the line IV—IV of Figure II.

Figure V is a plan view, partly in section, showing a modified form of the invention.

Figure VI is an end elevation of the assembly shown in Figure V.

Figure VII is a side elevation, partly in section, of the assembly shown in Figure V.

These specific figures illustrate perferred embodiments of the invention and are not intended to impose limitations on the claims.

According to the invention the accuracy of a hydraulic scale is improved by eliminating, in the force transmission path from the receiving end of the hydraulic force transmitting system to the load counterbalancing mechanism, all joints or connections which may slip under load or which may assume different positions for a given load. By eliminating these sources of relative movement it becomes possible to calibrate the load counterbalancing mechanism for the spring-scale effect of the hydraulic system or to introduce other compensation to counteract the spring effect. One suitable method of compensation is to raise the center of gravity of one of the levers of the load counterbalancing mechanism a sufficient amount so that the resulting overturning moment exactly balances the spring effect of the hydraulic elements. The principal difficulty with this method of compensation is the problem of maintaining the position of the counterbalancing mechanism with respect to hydraulic elements. Any error in the positions results in an error in the scale indication. The precise positioning of the receiving element of the hydraulic force transmitting system and the load counterbalancing mechanism is accomplished by providing either a single casting to which the hydraulic pressure receiver is attached and on which the load counterbalancing mechanism is mounted or separable parts for mounting these members which parts are bolted together along planes transverse to the lines of action of the principal forces transmitted from the hydraulic systems to the counterbalancing mechanism. In this manner all possibility of slipping joints is removed from the assembly. The possibility of changes in relative position at the knife edges of the lever are effectively prevented by utilizing an improved pivot and bearing of the type shown in U. S. Patent No. 2,368,626.

The invention is illustrated as it is incorporated in a hydraulic weighing scale. Such a weighing scale comprises a rectangular load receiving deck 1 supported on longitudinally extending girders 2. At each corner of the deck 1 the girders 2 are supported on a depending bracket 3 the bottom of which is provided with a horizontal crossbar 4 engaging a link 5 suspended from a crossbar 6 spanning the space between the sides of an open-ended box-like member 7. The box-like member 7 is supported by a hydraulic capsule 8 comprising a recessed base member 9 and an upper plate 10. The space between the recessed member 9 and the upper member 10 is filled with a hydraulic fluid, the hydraulic fluid being retained by a flexible yet nonstretchable diaphragm 11. The box-like member 7 and the upper plate 10 of the capsule 8 are prevented from tipping by stabilizer rings 12 surrounding the box-like members 7 and bolted to the upper plates 10. The rings 12, one for each of the capsules supporting the load receiver, are joined by an H-shaped pipe and I-beam framework 13 which, while not designed to carry any of the load on the deck, serves to hold the upper plates 10 of the capsules 8 in perfect alignment. Horizontal oscillation of the deck 1 in response to movements of loads is permitted by the swinging action of the links 5 without producing any deformation of the hydraulic capsules 8.

Loads placed on the deck 1 are supported by hydraulic pressure in the capsules 8. The hydraulic pressure from each of the capsules is transmitted through one of a series of tubes 14 to a pressure receiving unit 15 mounted on a pedestal 16 erected from a base 17. A series of struts 18 extending upwardly into the pressure receiving units 15 transmit force to a lever 19 fulcrumed on stands 20 erected from the base 17. The lever 19 extends between spaced apart legs of the pedestal 16 and at its far end is pivotally engaged by a stirrup 21 depending from a steelyard rod 22 supported from a load pivot 23 of a weigh beam 24. The weigh beam 24 is fulcrumed on a fulcrum stand 25 erected from a weigh beam shelf 26 which in turn is supported on pipe stands 27 and 28. A poise 29 slidably mounted on the weigh beam 24 serves to counterbalance loads applied through the steelyard rod 22.

As shown in Figure II, the lever 19, substantially in the form of an A, has fulcrum pivots at the end of its legs and a power pivot at its apex. The pressure receiving units 15, one for each of the capsules 8, are disposed in a row above the crossbar of the A. In this arrangement the mechanical forces produced by the hydraulic transmission systems are added together by the lever 19.

Referring to Figure IV hydraulic pressure generated in the capsules 8, serving as supports for the load receiver 1, is transmitted through the tubes 14 to the pressure receivers 15 and acts on a bellows installed within the pressure receiving unit 15. The force generated thereby is transmitted through the strut 18 and applied through a flexure plate stabilized pivot and bearing 30 to the lever 19. The pivot and bearing 30 comprises a flat bottomed bearing strip 31 rockably mounted at the bottom end of the strut 18 and resting on a knife edge 32 formed in the upper surface of a knife edge block 33. A thin ring 34 anchored to the ends of the knife edge block 33 and to the bearing strip 31 serves to hold the parts in operative relation. Because the lower surface, the knife edge contacting surface, of the bearing strip 31 is flat, lateral movements of the strut 18 will not vary the height of the strut with respect to the lever 19 and therefore will not affect the height of the bellows installed within the pressure receiving unit 15. Fulcrum bearings 35 and load pivot bearings 36 of the lever 19 are similarly constructed.

To further insure freedom from relative movement between the operating parts, the base 17, which may be secured to a foundation by bolts passing through holes 37, 38 and 39, has the fulcrum stands 20 and the pedestals 16 cast as integral parts thereof. In this manner each of the pressure receiving units 15, formed with a mounting flange 40 adapted to be held securely in position on vertical ways 41 by a pair of cone-pointed adjusting screws 42 engaging sloped ends 43 of the flange 40, is held in precise dimensional relationship with respect to the lever 19. The adjustment provided by the adjusting screws 42 does not detract from the dimensional stability of the assembly because the cone-pointed screws besides exerting direct clamping pressure against the ends of the flange 40 also exert a horizontal force tending to seat the flange 40 against the ways 41.

The improved dimensional stability gained through the use of a single casting would be of little value if the load counterbalancing mechanism such as the beam 24 was not also precisely positioned. This follows because the position of the strut 18 with respect to the pressure receiving unit 15 varies with deflections of the lever 19 whether those deflections are the result of weighing movement of the counterbalancing mechanism or some other spurious movement or deflection. Therefore the pipe stand 27 which supports the fulcrum end of the beam shelf 26 is provided at its lower end with a shoulder 44 adapted to rest on the top of the pedestal 16. This arrangement, by transmitting the force by compression, is much stronger than a simple friction clamp acting on the sides of the pipe.

When the load counterbalancing mechanism consists of a weigh beam and poise as indicated in Figure I the resiliency of the hydraulic system affects the sensitivity of the indication but not its absolute value unless the steelyard rod 22, a lever 19 or some of the connections involved between the lever 19 and the weigh beam 24 deflect under load. As it is desirable that the scale be maintained as sensitive as possible the center of gravity of the weigh beam 24 is intentionally located above its pivot axis by an amount sufficient to produce an overturning moment whose effect on the weighing is equal and opposite to the spring effect of the hydraulic force transmitting system. Because this compensation, which restores the sensitivity of the scale, depends upon the deflection of the bellows in the pressure receiving unit 15 and a corresponding angular movement of the weigh beam 24 it is clearly apparent that the relative positions of these members must be very precisely maintained. Any error in their relative position, such as may be caused by slippage of the pipe stand 27 in the pedestal 16 or slippage of the pressure receiving unit 15 with respect to the pedestal 16 or shift in any of the knife edge bearings, will appear as an error in the weight indication.

Furthermore, as the accuracy of weight indication is dependent upon the strict correspondence of position of the pressure receiving unit elements and the weigh beam 24 it also follows that a difference in indication for a given load will be obtained depending upon whether load is being added or subtracted when slipping of any of the joints or connections occurs. The force required to produce the slipping combined with the spring effect of the system accounts for this error.

If a pendulum or spring counterbalance is substituted for the weigh beam 24 the spring effect of the hydraulic system may be included in the calibration of the pendulum or weighing spring. However the weight indication can still be detrimentally affected by any slipping or shifting of the elements of the force transmitting system because the weight indication is taken from the position of the pendulum and that position must accurately represent the position of all parts of the weighing system.

Occasionally it is desirable to be able to interchangeably use automatic or beam counterbalancing mechanism. It is also desirable that the same counterbalancing mechanism may be used either on a scale employing hydraulic force transmitting systems or on a scale employing lever systems. A well constructed lever system has no counterbalancing effect of its own and therefore transmits from the load receiver to the load counterbalancing mechanism a precise fraction of the load force which fraction is constant and unaffected by deflections of the lever system. Compared to this, hydraulic force transmitting systems are subject to the fault that they tend to counterbalance part of the load themselves. Therefore it has been impracticable to use standard counterbalancing mechanisms in connection with hydraulic force transmitting systems when accuracy was required.

In Figures V, VI and VII a modification of the invention is shown, the modification consisting of an assembly of hydraulic pressure units and a lever adapted to transmit force to a load counterbalancing mechanism. This modification of the invention comprises a base 45 on which a bridge member 46 is mounted. The bridge member 46 includes end standards 47 and 48 and a cross member 49. A series of pressure receiving units 50 connected by means of tubes 51 to hydraulic capsules supporting a load receiver are adjustably mounted in the cross member 49 between cone-pointed screws 52 and 53. Struts 54 extending downwardly from the pressure receiving units 50 rest on knife edges 55 and transmit force through the knife edges 55 to a lever 56. The lever 56 is fulcrumed on bearings 57 held in fulcrum stands 58 forming parts of the end standards 47 and 48 of the bridge 46.

The lever 56 is connected through a load pivot 59, stirrup 60 and steelyard rod 61 to load counterbalancing mechanism which is not shown. The lever 56 is shaped so that its center of gravity is positioned above its pivot axis. The overturning moment produced by making the lever 56 top heavy compensates for the unavoidable spring effect of the hydraulic systems. In this example the compensation is effected immediately adjacent the hydraulic pressure receiving units and therefore the force transmitted to the steelyard rod 61 is not affected by the counterbalancing effect of the hydraulic system and any conventional load counterbalancing mechanism may be connected to the steelyard rod 61 with assurance that it will accurately indicate the load being weighed on the scale.

It is essential in this modification, as in the previous example, that the position of the lever 56 and the pressure receiving units 50 accurately correspond. Furthermore, since the compensation is obtained by raising the center of gravity of the lever 56 it is also essential that the base 45 and the bridge 46 connected thereto be rigidly mounted so that it cannot tip during operation.

By observing these important details of construction—eliminating all slipping between parts and rigid assembly—it is possible to build hydraulic weighing scales whose quality is comparable to high-grade lever scales both as to sensitivity and overall accuracy.

Having described the invention, I claim:

In a weighing scale employing hydraulic systems for transmitting force from a load receiver to a load counterbalancing mechanism, in combination, a base, a pair of posts erected from the base and carrying fulcrum bearings, a lever pivotally mounted on the fulcrum bearings, a standard erected from the base and bridging over the lever, a plurality of hydraulic pressure receivers secured to a side of the standard and positioned over load pivots of the lever, struts for transmitting force from the pressure receivers to the load pivots, said receivers being adjustable along the axes of the struts, a load counterbalancing mechanism operatively connected to the lever, and a support for the load counterbalancing mechanism, said support being erected from and transmitting the reaction force of the load forces applied to the counterbalancing mechanism directly to said standard upon which the pressure receivers are mounted.

LAWRENCE S. WILLIAMS.

REFERENCES CITED

The following references are of record in the file of this patent:

UNITED STATES PATENTS

| Number | Name | Date |
| --- | --- | --- |
| 340,008 | Roeder | Apr. 13, 1886 |
| 404,290 | Koch | May 28, 1889 |
| 1,969,364 | Gilbert | Aug. 7, 1934 |
| 2,334,242 | Bohannan | Nov. 16, 1943 |